United States Patent
Abdelmalek

[11] Patent Number: 5,214,932
[45] Date of Patent: Jun. 1, 1993

[54] HERMETICALLY SEALED ELECTRIC DRIVEN GAS COMPRESSOR - EXPANDER FOR REFRIGERATION

[76] Inventor: Fawzy T. Abdelmalek, 12807 Willowyck R., St. Louis, Mo. 63146

[21] Appl. No.: 717,810

[22] Filed: Jun. 19, 1991

Related U.S. Application Data

[63] Continuation-in-part of Ser. No. 706,328, May 28, 1991, Pat. No. 5,136,854.

[51] Int. Cl.⁵ .............................................. F01K 25/08
[52] U.S. Cl. ...................................... 62/238.4; 62/332; 60/651
[58] Field of Search .................. 60/651, 238.4; 62/332, 62/498, 467

[56] References Cited

U.S. PATENT DOCUMENTS
2,721,728 10/1955 Higgins .......................... 62/238.4 X

FOREIGN PATENT DOCUMENTS
3032921 4/1982 Fed. Rep. of Germany ........ 60/651

Primary Examiner—William E. Wayner
Attorney, Agent, or Firm—Peoples, Hales, Coleman

[57] ABSTRACT

Hermetically sealed electric driven gas compressor-expander for use in refrigeration system where low temperature waste energy rejected from the condenser is recovered and used to produce kinetic energy to assist driving the compressor, and thus reducing the electric power required for refrigeration.

6 Claims, 7 Drawing Sheets

5,214,932

HERMETICALLY SEALED ELECTRIC DRIVEN GAS COMPRESSOR - EXPANDER FOR REFRIGERATION

RELATIONSHIP TO OTHER PENDING APPLICATIONS

This application constitutes continuation-in-part of my patent application Ser. No. 706,328, filed May 28, 1991 now U.S. Pat. No. 5,136,854 and contains claims and pertinent specification transferred from my application Ser. Nos. 711,797 and 712,718 now abandoned.

BACKGROUND OF THE INVENTION

1. Field of the Invention

The present invention relates generally to refrigeration systems and more particularly to a positive displacement type compressor-expander unit to provide compression of low pressure vapor refrigerant for cooling cycle and expansion of high pressure vapor refrigerant for thermal power cycle. The unit has an electric drive motor with overhung shaft on both sides, directly coupled and supported on the drive shaft, and. The main assembly of the motor, compressor and expander are contained in hermetically sealed enclosure. In the present invention the expander provides part of the work required to drive the compressor, therefore, substantially improves the efficiency of the refrigeration cycle through reduction of the net work input into the system.

2. Description of the Prior Art

Vapor compression direct expansion refrigeration cycle is well known in the field of refrigeration/heat-pump systems. In theoretical vapor compression refrigeration cycle, saturated vapor refrigerant at low pressure enters a compressor and undergoes isentropic compression. The high pressure vapor enters a condenser, where heat is rejected from the fluid at constant pressure, the working fluid leaves the condenser as saturated liquid, an adiabatic expansion process follows across a direct expansion valve or capillary tube. The working fluid is then absorbs heat and evaporates at constant pressure before entering the compressor.

In the past, the design of direct expansion refrigeration units has not generally taken advantage of the low temperature level energy rejected from the condenser. Liquid expanders were employed to take advantage of energy lost in the execution of expansion through throttling of the liquid refrigerant. For example a refrigerant expander compressor system of this type was enclosed in U.S. Pat. No. 3,934,424, another example is an integral turbo compressor-expander system for refrigeration was used to permit power recovery by the compressor from the expansion of the liquid refrigerant is enclosed in U.S. Pat. No. 3,494,145.

Generally, however, systems as described above which utilize or attempt to utilize the work used in throttling or expansion process of liquid refrigerant fluids have not found wide acceptance. Accordingly, the equipment necessary for its recovery has not been thought to be economically feasible because very little work has been recovered and very small improvement of performance and efficiency of the basic vapor compression refrigeration cycle has been achieved.

SUMMARY OF THE INVENTION

The present invention provides hermetically sealed or enclosed electric driven gas compressor assisted with a gas expander. On the compressor side, low pressure vapor from the refrigeration evaporator enters the intake of the compressor and is compressed into the superheat region, and discharged at high pressure level to the tube side of a shell and tube or plate type heat exchanger, where the superheated gas exchanges its heat and condenses to saturated liquid, consequently on the other side of the heat exchanger, a high pressure refrigerant of the expander system is heated and the evaporated gas enters the expander to undergo isentropic expansion and drives its power shaft. In the present invention the refrigeration cycle and the power cycle are thermally coupled through exchanging their thermal energy in a heat exchanger and are mechanically, and electrically coupled by a common drive shaft and the electric motor.

It is therefore a principle object of the present invention to conserve energy by utilizing heat rejected from the air conditioning or refrigeration system to produce kinetic energy and drive the compressor.

It is further an object of the present invention to provide a gas compressor-expander unit incorporating electric drive motor with common drive shaft for use in residential and commercial air conditioning and refrigeration systems.

It is further an object of the present invention to provide such a compression-expansion apparatus for refrigeration systems which is inexpensive to the maintain and to operate.

It is further an object of the present invention to reduce the electric power required for driving refrigeration systems.

It is further an object of the present invention to achieve high efficiency of refrigeration system.

The present invention fulfills the long felt need to reduce and conserve electric power required to drive small cooling and refrigeration systems. The above and other objects and advantages of the present invention will become apparent from the following specifications, drawings and claims. It will be understood that the particular embodiments of the invention are shown by way of illustration only and not as limitation of the invention. The principle features of this invention may be employed in various embodiments without departing from the scope of the invention.

DETAILED DESCRIPTION OF THE PRESENT INVENTION

Figure 1:
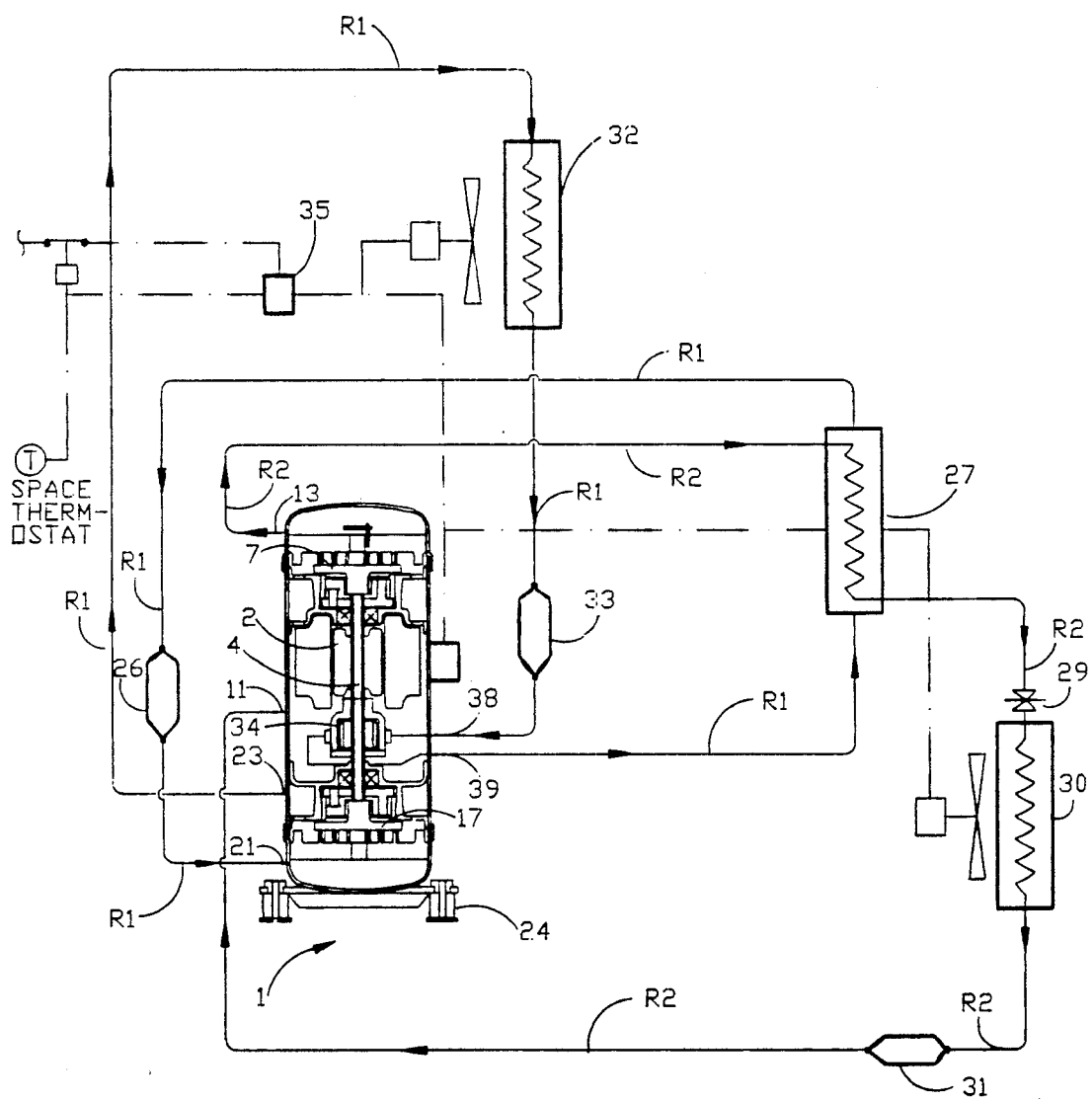
FIG. 1 is a schematic diagram for refrigeration system employing a gas compressor-expander unit.

In a gas compression direct expansion refrigeration cycle, the high pressure liquid refrigerant expands adiabatically in an expansion valve or in a capillary tube before entering the evaporator coil, the heat of the building or alike, is removed, and the liquid refrigerant is evaporated, the hot gas is then compressed by a gas compressor to a relatively higher pressure and temperature levels, then enters the condenser where the heat load and the heat of compression is rejected to atmosphere at constant pressure, the hot gas is cooled and is condensed at ambient conditions.

In the present invention, cooling and condensing of the hot gas refrigerant is completed by thermal exchange of its heat energy with another refrigerant fluid which is used to drive a thermal power gas expander. The hot pressure liquid refrigerant of the power expander circuit enters in a heat exchange relationship with the high pressure hot gas of the refrigeration circuit. While the relatively high pressure hot gas refrigerant in the refrigeration circuit is cooled and condensed, the relatively high pressure liquid refrigerant of the expander circuit is heated and evaporated. Depending on the type of refrigerant used, the hot refrigerant gas at high pressure, preferably in the range from 60 to 300 psia, expands isentropically through the gas expander to a lower pressure preferably in the range from 20 to 80 psia, its temperature drops approaching the ambient temperature. The saturated vapor is then cooled at ambient conditions by air or water to change its state to liquid. The liquid refrigerant is then pumped back to the high pressure side of the power expander cycle.

The thermal energy of the working fluid of the power cycle is removed in the form of "work"; (1) partly provides kinetic energy needed to drive the compressor of the refrigeration cycle; and (2) partly provides the cooling effect needed to condense the refrigerant of the air conditioning refrigeration system.

For purposes of the present invention, low vapor condensation at the expander exhaust is preferred, depending upon the type of working fluid refrigerant used and the operating pressures and temperatures, the expander may operate at the same pressure and temperature levels used for the gas compressor, some deviation is expected depending on the system design and working conditions. The scroll expander in this invention is to produce work to assist driving the scroll compressor, the working refrigerant of the expansion cycle can be of the same type used for the compression cycle. Depending on the condensing temperature, the power produced by the expander will vary between 20 to 70 percent of the power required by the compressor, the remaining power needed shall be provided by the electric motor drive.

Reciprocating, rotary, helical screw, and scroll type compressors are well known and probably the most new developing type positive displacement types for residential and commercial air conditioning and refrigeration systems. They offer high efficiency, and because of reasons manufacturing limitations, the scroll type units are presently available for narrow range of system applications for air conditioning and refrigeration including coolers, refrigerators and freezers. The design and operating parameters of the positive displacement compressors are well developed and understood, and the technology presents no particular manufacturing problems. However, competition, high energy costs, and increased federal regulations are compelling manufacturers to develop more efficient systems.

Any positive displacement gas compressor when properly modified will operate in reverse as expander and can be used to produce power. Expander in this invention is used to produce work to drive the compressor of the refrigeration or air conditioning system.

A number of refrigerants, including for example freon R-11, R-12, and R-22 may be employed in the present invention. The new Clean Air Act has regulated production and use of all types of refrigerants which contain chlorofluorocarbon (CFC), including R-11, R-12, R-500 and the hydrogenated chlorofluorocarbon (HCFC) chemicals which include R-22. Although, the production of these refrigerants shall be banned by year 2000 new refrigerant products have been developed. Provided such new products prove to be safe, nonflammable, nontoxic and meet the new Clean Air Act limit requirements for the ozone Depletion Potential (ODP), The Greenhouse Warming potential (GWP), and the Allowable Exposure Level (AEL), they may be employed in the present invention.

Refrigerant HCFC 123, developed for low pressure refrigeration systems replaces R-11, and refrigerant HCFC-134a for medium pressure refrigeration systems, replaces R-12. These new products have been certified by the Air Conditioning and Refrigeration Institute and by the Environmental Protection Agency.

OPERATION

In FIG. 1 the invented system 36 has a thermally coupled compression refrigeration system and expansion power system, it includes an electric driven compressor-expander unit 1, the compressor has discharge 13 and suction 11 connected to the refrigeration closed circuit, in which the high pressure hot gas enters heat exchanger 27 and undergoes a thermal heat exchange relationship with the high pressure liquid refrigerant R1, the hot gas of refrigerant R2 is cooled and condensed, and the cold liquid of refrigerant R1 is heated and evaporated. The liquid refrigerant R2 undergoes an adiabatic expansion process through an expansion valve 29 (or capillary tube) to evaporator 30, where the expanded low pressure liquid refrigerant is evaporated while cooling the building or alike. The low pressure saturated vapor of refrigerant R2 then enters gas accumulator 31 before entering the compressor intake 11, where it is compressed to the high pressure level and the refrigeration cycle is completed.

On the other side, the expander has intake 21 and discharge 23 connected to the power generation closed circuit, the evaporated high pressure gas refrigerant R1 is released from heat exchanger 27 to gas accumulator 26, then to the expander intake 21, the gas expands isentropically through the expander, and kinetic energy is removed causing the expander orbiting spiral 17 to move and the common shaft 4 to rotate and to drive the compressor orbiting spiral 7. The low pressure gas of refrigerant R1 exits the expander discharge 23 to enter condenser 32 where the saturated vapor is condensed to liquid state when removing its latent heat by cooling at ambient temperatures. The liquid refrigerant R1 enters liquid receiver 33, then pumped to high pressure side of the power cycle by a liquid pump 34, back to heat exchanger 27 and the power cycle is completed. The kinetic movement produced by the expander orbiting spiral 17, is transmitted through the orbiting link 15 to turn the common shaft 4, which operatively connected to the compressor orbiting link 5, forcing the orbiting spiral 7 to move inside the stationary spiral 6 of the scroll compressor. The electric motor provides the difference of the power required to drive compressor and the liquid refrigerant pump and that produced by the expander. A control panel 35 provides control for the system operation to run and stop by temperature setting.

Figure 2:
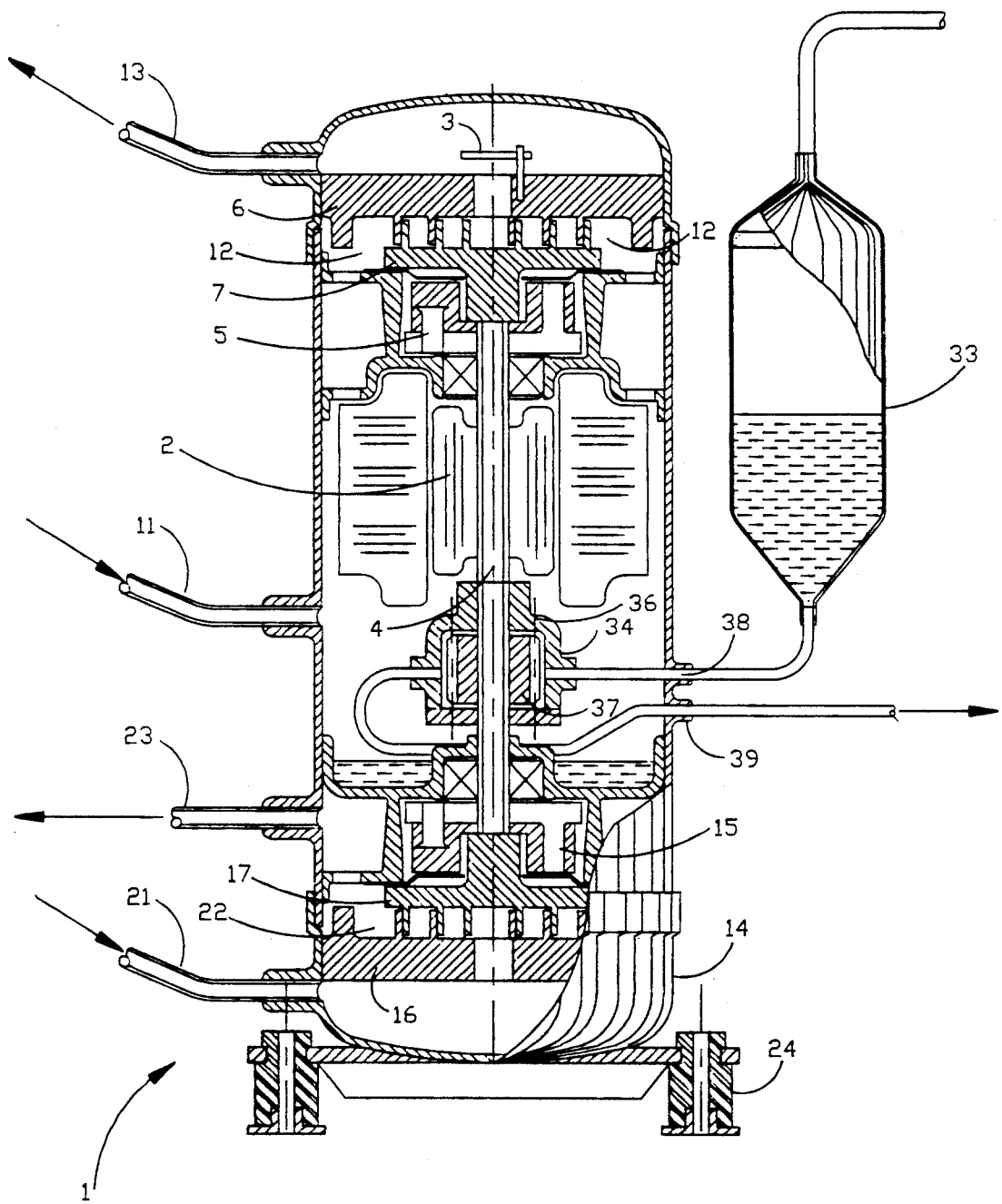
FIG. 2 is a sectional view showing a hermetically sealed scroll gas compressor-expander unit.

FIG. 2 indicates a sectional view of hermetically sealed electric driven scroll type compressor-expander unit 1 employed for the present invented system 36. The invented scroll gas compressor-expander unit consists of a hermetically sealed enclosure 14, which contains an electric motor having a rotor 2 and extended shaft 4, said drive shaft is operatively connected on one end to the expander orbiting link mechanism 15 connected to an expansion spiral 17, and is connected on the other end of the compressor orbiting mechanism 5, which is connected to a compression spiral 7. A positive displacement rotary gear type liquid refrigerant pump 34 is directly driven by the common shaft 4. The hermetically sealed enclosure 14 is supported by vibration isolation means and contains the compressor-expander and pump assembly secured between the inner surface of the enclosure and the stationary spiral assemblies. The compression mechanism consists of stationary scroll 6, orbiting spiral assembly 7, low pressure intake 11 and high pressure discharge 13, when the drive shaft 4 rotates by the electric motor rotor 2, the orbiting spiral 7 forms pockets with the stationary spiral 6 and, continuously forces and presses the gas pockets against the inside surface of the stationary spiral to form sealed compartments, which undergo a continuous decrease in volume, and consequently increase in the gas pressure starting from the low pressure chamber 12, and the ending at the high pressure chamber at compressor discharge 10. A check valve 3 prevents the high pressure gas from driving the compression spiral backward when the unit stops.

Similarly the expander assembly consists of a stationary spiral 16, orbiting spiral assembly 17, high pressure intake 21, and low pressure discharge 23, when the drive shaft 4 starts by the electric motor rotor 2, the orbiting mechanism 15 forces spiral 17 to orbit against the inside surface of the stationary spiral 16 to form sealed compartments and the high pressure gas forces the orbiting spiral to undergo a continuous increase in volume and consequently decrease in the gas pressure starting from the high pressure chamber at the expander inlet 20 and ending at the low pressure chamber at the expander discharge 22. The orbiting spiral compartment of the expander is hermetically separated and sealed from the compression/motor compartment. The positive displacement rotary gear liquid pump 34 is directly mounted to the common drive shaft, and consists of housing assembly 36 and rotary gears mechanism assembly 37, low pressure liquid inlet 38 and high pressure liquid discharge 39. The low pressure inlet 38 is connected to outside the hermetically sealed shall 14 to liquid receiver 33. High pressure discharge 39 extends to outside the hermetically sealed shell 14 for connection to the heat exchanger.

For purposes of simplicity, the drawings do not indicate the prior art means for motor cooling, forced oil lubricating system, motor thermal overload production, oil heater, refrigerant filters, and controls for refrigerant flow, pressure, temperature and other electric and electronic specialties. The liquid rotary pump may be mounted on either side of the motor drive.

The expander intake and discharge outlets are directly connected to outside the shell assembly and is separated from the compressor-motor compartment, to prevent cross contamination between the compressor and expander low pressure refrigerant streams. The hermetically sealed enclosure assembly is provided with mounting supports having vibration isolation means.

Figure 3:
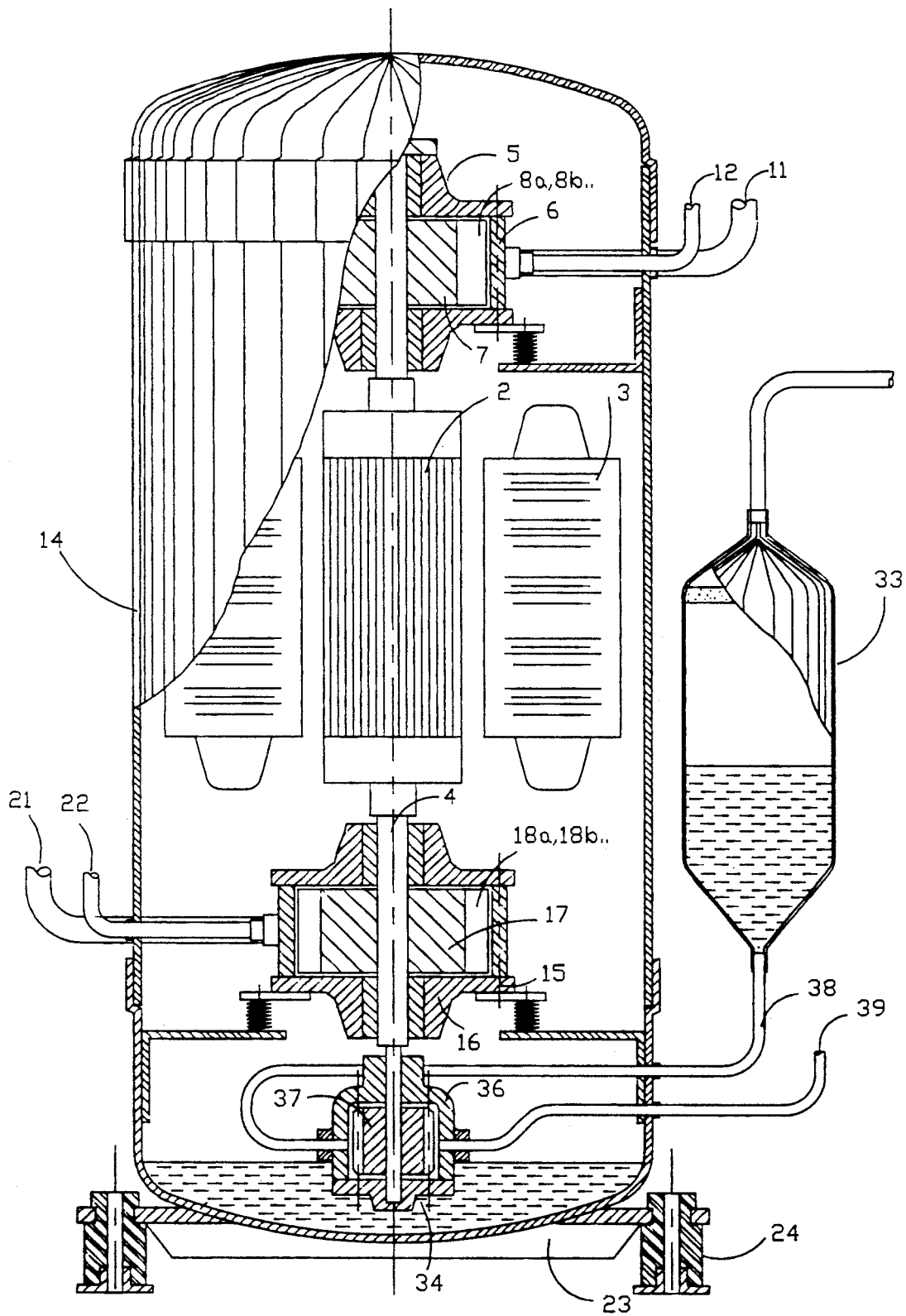
FIG. 3 is a sectional view showing a hermetically sealed rotary compressor-expander unit.
Figure 4A:
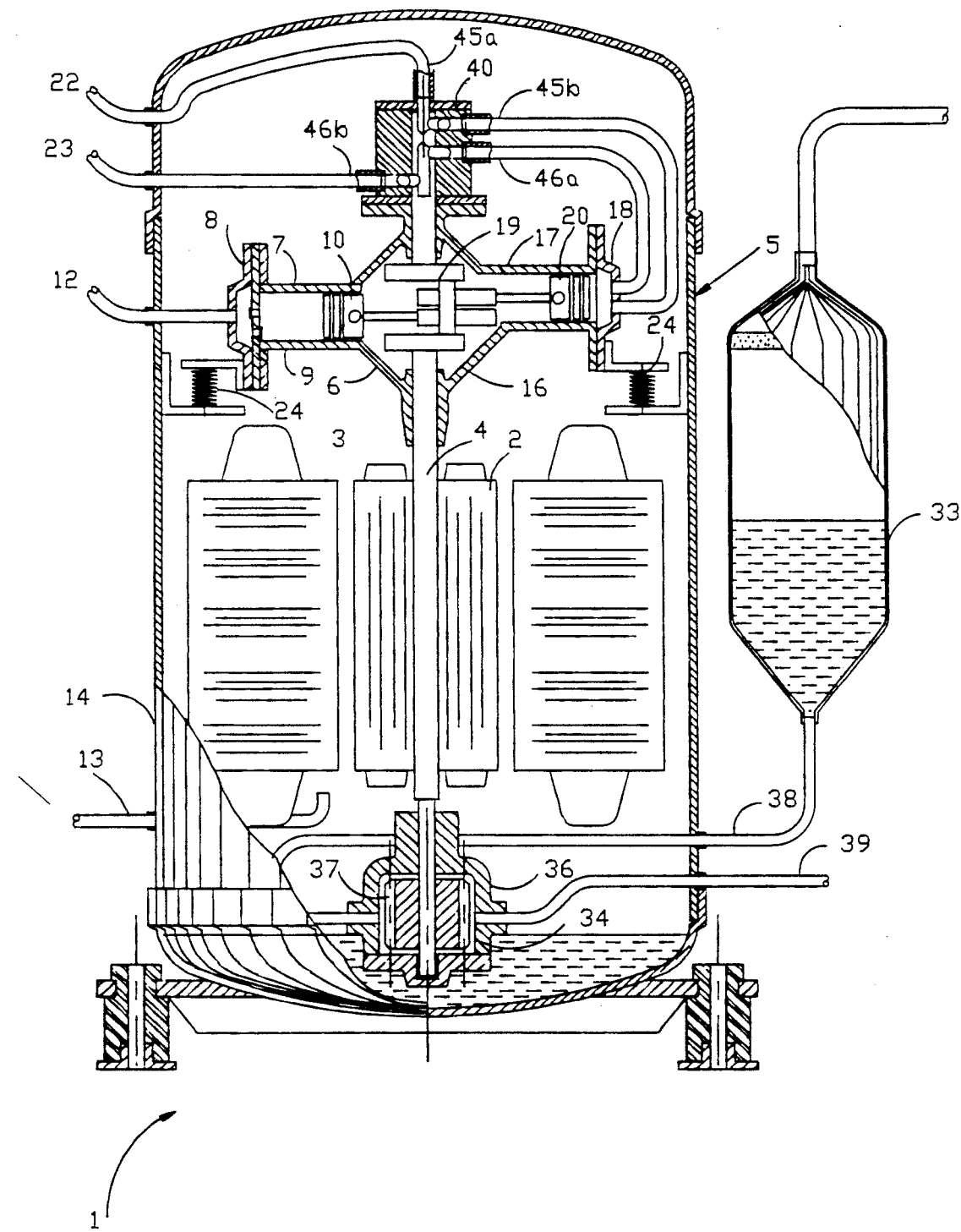
FIG. 4a is a sectional view showing a hermetically sealed reciprocating compressor-expander unit having single compression cylinder, and single expansion cylinder.
Figure 4B:
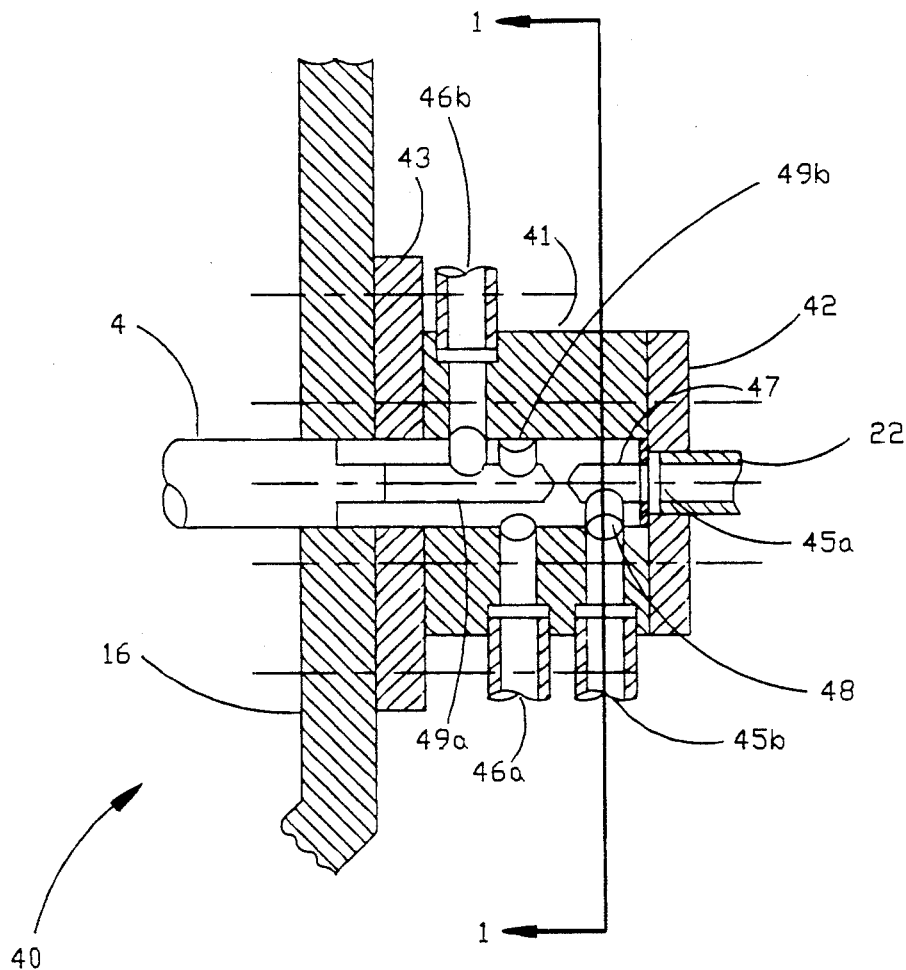
FIG. 4b is a sectional view of a rotary valve assembly used for the reciprocating expander.
Figure 4C:
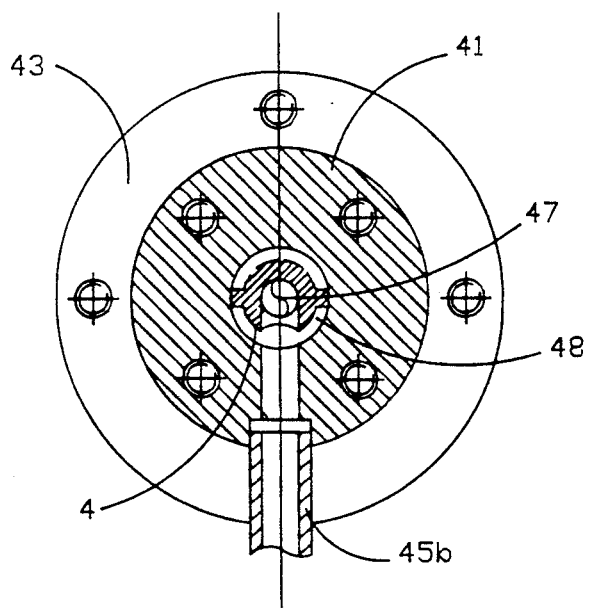
FIG. 4c is a sectional view of the rotary valve along cut line A—A indicated on FIG. 5.
Figure 5:
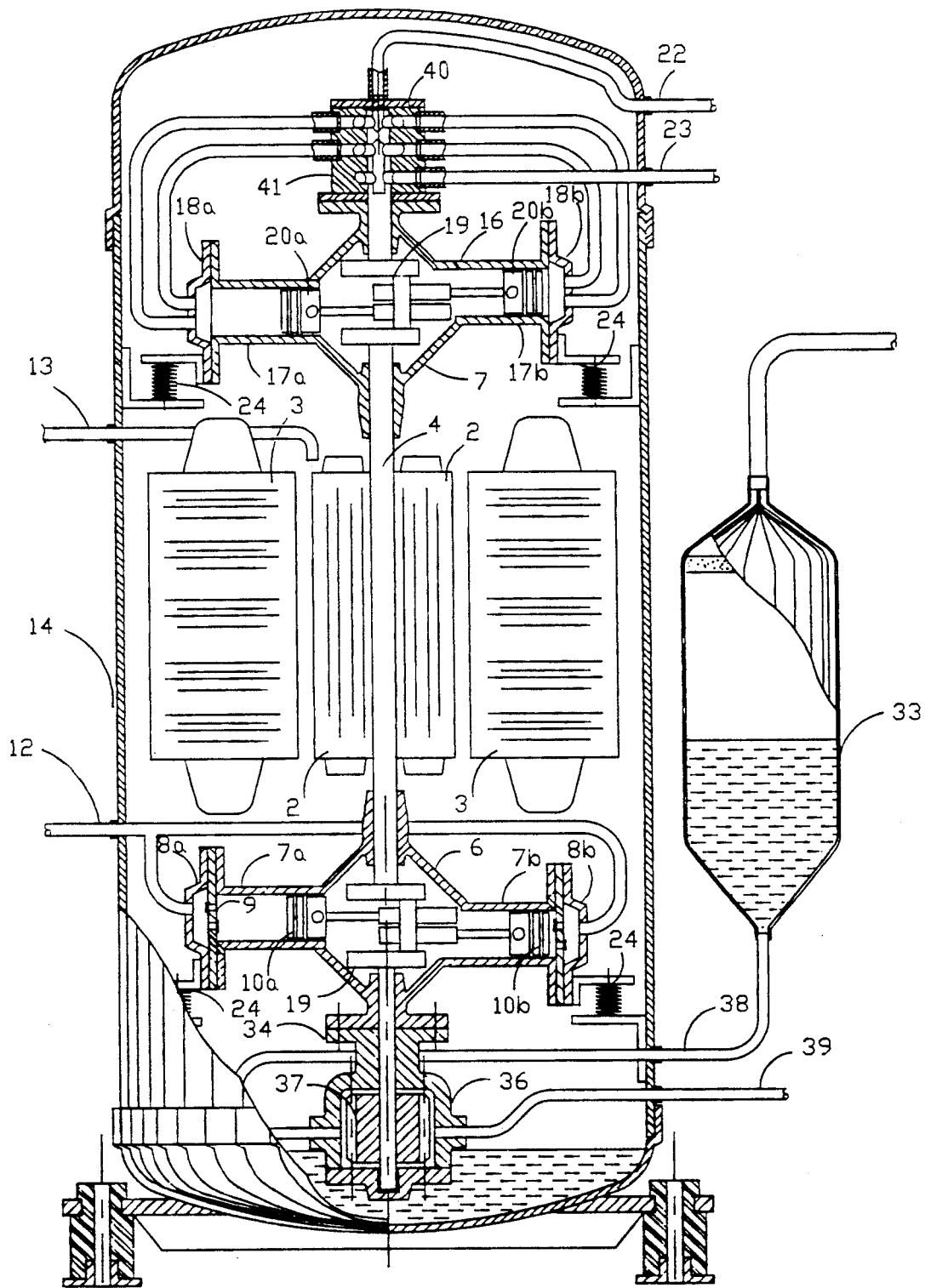
FIG. 5 is a sectional view showing a hermetically sealed multiple cylinder reciprocating compressor-expander unit.
Figure 6:
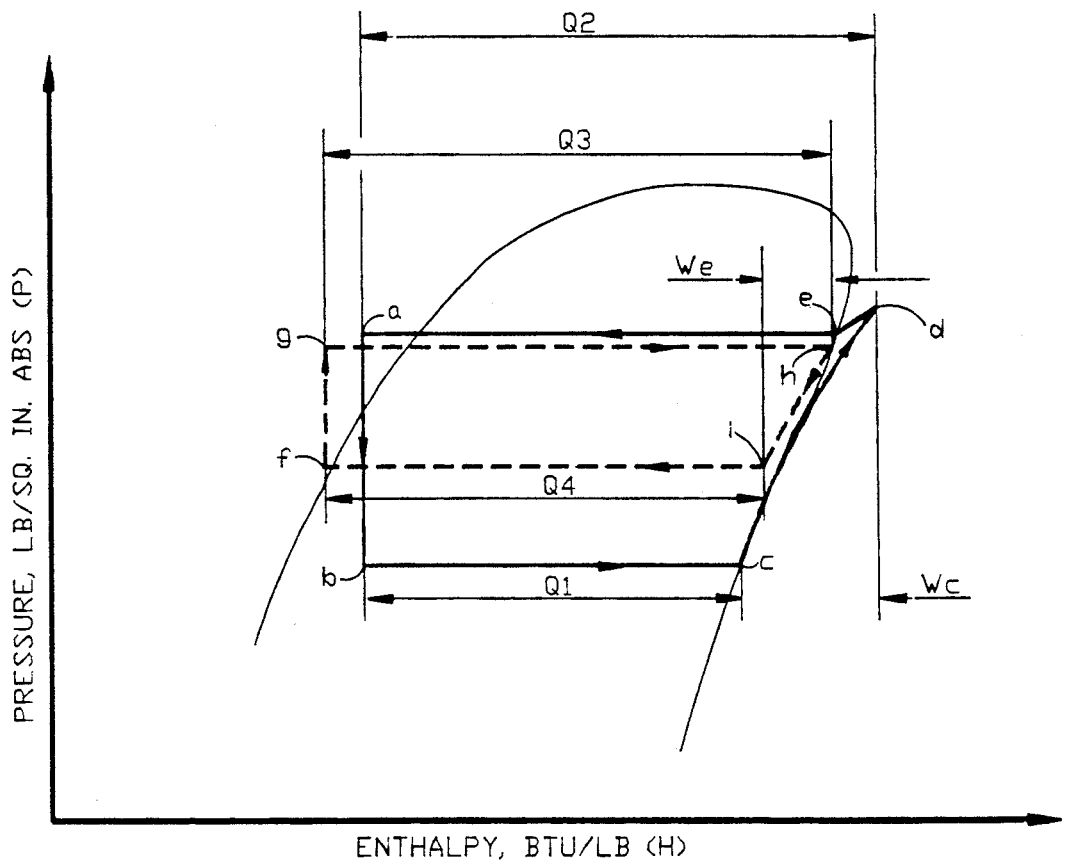
FIG. 6 is a graphical illustration of a thermally coupled vapor compression refrigeration cycle and vapor expansion power cycle on the enthalpy-pressure diagram.

FIG. 3 illustrates the thermodynamics of the compression refrigeration cycle, and the expansion power cycle, expressed on pressure-enthalpy co-ordinates. Although it is appreciated that idealized refrigeration cycle and idealized expansion power cycle are not possible of attainment, it establishes a criterion of performance from which the merits of the present invention can be measured. In the refrigeration cycle, a liquid refrigerant at point (a) undergoes an adiabatic change to liquid-vapor mixture by expanding along path (ab), heat is isothermally added to the refrigerant during evaporation along path (bc), during which useful refrigeration or cooling is obtained. The point (c) assumed dry vapor, the vapor is compressed isentropically along path (cd) to high enough pressure to permit heat rejection in the condenser along path (dea). Initially, vapor superheat along path (de) is rejected after which the heat of vaporization is rejected along (ea). Ideally, the heat added to the system at the evaporator $Q1 = Hc - Hd$ by the work input by the compression $Wc = Hd - Hc$, and the heat rejected in the condenser $Q2 = Hd - Ha$ or the net work done by compression is equal to the difference between the heat rejected and heat added or $Wc = (Q2 - Q1)$. In the expansion power cycle a low pressure liquid refrigerant at point (f) is adiabatically pumped to a higher pressure level to reach point (g). The liquid refrigerant exchanges heat with the refrigerant of the compression cycle where heat is added at constant pressure along path (gh). Ideally, the heat added to the expander cycle $Q3 = Hh - Hg$ should be equal to the heat Q2 rejected from the refrigeration cycle. The point (h) assumed dry vapor, the vapor is expanded isentropically along path (hi), to a lower pressure but still permit heat rejection in the condenser along path (if). The heat rejected $Q4 = Hi - Hf$. The work output by expansion $We = (Q3 - Q4)$. Ideally the sum of heat and work input must equal to the heat and work output or $(Q1 + Wc) = (Q4 + We)$. In a conventional refrigeration system the coefficient of performance (COP) for the system is known to be the rate of the refrigeration effect to the work required to produce it, or $COP = Q1/Wc$. For the idealized refrigeration system $Q1/Wc$ can be written as $Q1/(Q2 - Q1)$. In the present invention the work required for the refrigeration shall be decreased by the work produced by the expander, the improved COP of the system $COP = Q1/(Wc - We)$ or $COP = Q1/(Q2 - Q1) = (Q3 - Q4)$.

Now of course, at higher condensing temperatures the expander cycle will have lower efficiency, but its ability to recover the work will increase rapidly as the condensing temperature drops. In the present invention, as in the prior art systems, the refrigeration effect increases when the condensing temperature decreases. In addition, the present invention offers increased power savings at lower condensing temperatures.

Figure 7:
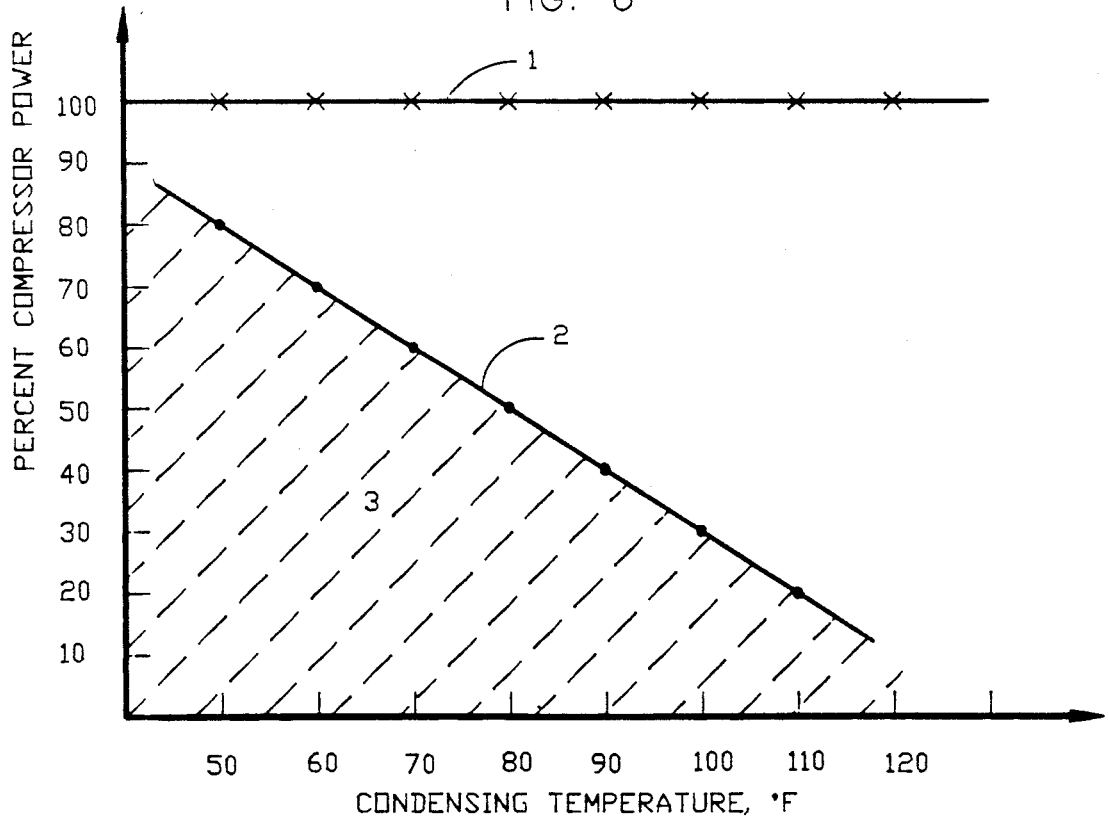
FIG. 7 is a graphical illustration of the energy savings of the present invention.

FIG. 7 indicates a graphical illustration of the energy savings of the present invention. For simplicity purposes it is assumed that the power required by the compressor will not change with the change in the condensing temperature. This relationship is represented by line 1. On the other hand, the power produced by the expander will increase with the drop in the condensing temperature. For example, when the condensing temperature is 105 degrees F., the expander will produce 25 percent of the power required by the compressor, and when the condensing temperature drops to 60 degrees F., the expander power will represent 70 percent of the power required by the compressor. It became obvious that the power savings of the invented system will vary with the condensing temperature as presented by the hatched area 3, and the year around average use of power for refrigeration may range between 50 and 60 percent of that required by the prior art systems.

In conclusion, viewed from the energy conservation standpoint, employing an expander utilizing the energy of heat rejected in the atmosphere is a viable means for tremendously improving the cycle efficiency as represented by an improved coefficient of performance. Since the useful work developed by the present system is so much greater than that delivered by prior art systems, the present system is believed to be economical in the sense that energy savings exceed amortized capital costs in a relatively short period of time. The expander could be actually manufactured from modified commercially produced compressors.

EXAMPLE: The following example indicates comparison data and performance of the invented system when compared with conventional compression-direct expansion refrigeration system. All data are based on 12,000 BTU/hour (one ton cooling) and represents certain particulars which may vary.

| I. REFRIGERATION SYSTEM | | |
|---|---|---|
| a. Refrigerant (R-12) Flow rate lb/min | 3.3 | |
| b. Cooling capacity BTU/hr. (tons) | 12,000 | (1.0) |
| c. Power requirement BTU/hr. (kw/hr) | 2550 | (.75) |
| d. Coefficient of performance (COP) | 4.7 | |
| II. EXPANDER SYSTEM | | |
| a. Refrigerant (R-12) flow rate lb/min | 3.3 | |
| b. Energy reclaimed from refrigeration condenser BTU/hour | 14,400 | |
| c. power produced by expander BTU/hr. (kw) | 1385 | (.40) |
| d. Energy used for high pressure refrigerant liquid pump BTU/hour (kw/hour) | 255 | (.075) |
| III. COMBINED SYSTEM | | |
| a. Net power generated by the system | 1130 | (.330) |
| b. Net power required for cooling | 1420 | (.420) |
| c. Coefficient of performance (COP) | | 8.4 |

The above indicates an estimated 44 percent savings of the power used for cooling, and indicates that the power needed to drive the liquid pump is less than 20 percent of the power produced by the gas expander.

While the present invention has been described with reference to particular embodiments thereof, it will be understood that numerous modifications can be made by those skilled in the art without actually departing from the scope of the invention. Accordingly, all modifications and equivalents may be restored to which fall within the scope of the invention as claimed.

What is claimed is:

1. In combination with a direct expansion/heat pump system wherein the improvement allows the heat rejected in the condenser to be recovered and utilized to actuate a positive displacement gas expander mounted on a common drive shaft of electrically driven positive displacement gas compressor, and a positive displacement liquid pump, the improvement which comprises:

a hermetically sealed housing which encloses a positive displacement gas compressor-expander-liquid pump assemblies mounted on a common drive shaft driven by an electric motor;

a refrigeration cycle closed circuit, and power cycle closed circuit having a common heat exchanger adapted to exchange heat between a refrigeration fluid and a power fluid;

a refrigeration-working fluid contained in said closed refrigeration circuit;

a power-working fluid contained in said closed power circuit;

an evaporator adapted to effect heat transfer between the refrigeration fluid and a secondary fluid;

means for directing relatively low pressure, relatively warm refrigerant fluid flowing from said evaporator into said gas compressor to pressurize the refrigeration fluid upon actuating the compressor;

an expansion valve;

means for directing the relatively high pressure, relatively cold refrigeration fluid flowing from said heat exchanger through said expansion valve simultaneously substantially reduce the pressure and temperature of said refrigeration fluid;

a conduit for directing the relatively high pressure, relatively hot vapor of the power fluid flowing from said heat exchanger through said gas expander simultaneously substantially reduce the vapor pressure and temperature of said power fluid;

a conduit for directing the expander vapor of the power fluid from said expander outlet to said condenser inlet;

a liquid filter/accumulator;

a conduit for directing the relatively low pressure condensate of the power fluid flowing from said condenser to enter said liquid filter/accumulator;

a conduit to direct said condensate of the power fluid from said filter/accumulator to the inlet of said pump, simultaneously substantially pressurizing the condensate of said power fluid;

a conduit for directing said pressurized condensate of said power fluid flowing from said pump to said heat exchanger substantially to heat and evaporate said power fluid.

2. The system according to claim 1 wherein said hermetically sealed housing contains a positive displacement gas compressor, a positive displacement gas expander, a positive displacement liquid pump and an electric motor assembly all mounted on a common power shaft.

3. A direct expansion refrigeration/heat pump system comprising:

a hermetically sealed housing enclosing a positive displacement gas compressor connected to a closed refrigeration circuit, a positive displacement gas expander and a positive displacement liquid pump connected to a closed thermal power circuit, and an electric motor assemblies all mounted on a common drive shaft;

a power circuit working fluid;

a condenser;

a conduit for directing the power fluid flowing from said condenser to said liquid pump to substantially pressurize said power fluid;

a heat exchanger;

a conduit for directing the pressurized power fluid flowing from said liquid pump to said heat exchanger to exchange heat with relatively hot refrigerant fluid of the refrigeration circuit and to substantially heat and evaporate said power fluid;

a conduit for directing the evaporated power fluid flowing from said heat exchanger to expand through said gas expander;

a conduit for directing the expanded vapor of the power fluid flowing from the outlet of said gas expander to said condenser;

a refrigeration circuit refrigeration fluid;

a conduit for directing the compressed refrigeration fluid flowing from the discharge of said gas compressor to said heat exchanger to substantially cool and condense said refrigerant fluid;

means to affect direct expansion of the high pressure condensate of the refrigeration fluid;

a conduit for directing said condensate of the refrigeration fluid flowing from said heat exchanger through said direct expansion means, to substantially reduce it's pressure, and temperature;

an evaporator to effect heat transfer between the relatively low pressure, relatively low temperature refrigerant fluid flowing from said direct expansion means, and a secondary fluid to heat and evaporate said refrigerant fluid, and to cool said secondary fluid;

a conduit for directing the vapor of said refrigerant fluid flowing from said evaporator outlet to said compressor inlet;

a solid state digital controller to electronically switch ON-OFF and to affect change of speed of the drive motor corresponding to the temperature control signals of said refrigeration system.

4. An apparatus to be employed in the combination of claim 3 for a hermetically sealed electric driven scroll type gas compressor-gas expander-liquid pump unit comprising:

a permanent magnet brushless, variable speed A.C. or D.C. electric motor having electronic commutated rotor fitted on a common drive shaft;

a scroll type gas compression mechanism adapted for compressing a refrigeration gas fluid said compressor mechanism characterized to have an orbiting spiral assembly, operatively connected to said common drive shaft, said orbiting spiral moves within a stationary spiral casing assembly, said stationary spiral casing has a low pressure gas intake port and a high pressure gas discharge port;

a scroll type gas expansion mechanism adapted for expanding a power gas fluid, said expansion mechanism is characterized to have an orbiting spiral assembly, operatively connected to said common shaft, said orbiting spiral moves within a stationary spiral casing assembly, said stationary spiral casing has a high pressure gas intake port and a low pressure gas discharge port;

a liquid positive displacement helical gear pump assembly adapted to pressurize the power fluid, said pump is directly fitted on said power shaft, and is characterized to have two intermeshing male and female gears enclosed in a sealed enclosure, said enclosure has a low pressure suction, and a high pressure discharge piping connections;

a liquid power fluid filter receiver connected to the intake of said liquid pump;

a permanent magnet brushless, variable speed A.C. or D.C. electric power motor having a rotor fitted on said power shaft, and is commutated by electronic switching means that switches the voltage supplied into the stator coil winding leads in response to the rotor's positions;

a hermetically sealed enclosure adapted to house the assembly of said electric motor scroll gas compressor, scroll gas expander, and rotary gear liquid pump, said enclosure is characterized to be assembled of two or more welded metal parts with sealed pipe and wire connections, and vibration isolation mounting support means;

means for forced oil lubrication, oil heating, motor winding cooling, and thermal overload protection.

5. An apparatus to be employed in the combination of claim 3 for a hermetically sealed electric driven sliding vane type gas compressor-expander, and liquid pump unit comprising:

a rotary sliding vane compression mechanism characterized to have a rotor assembly with sliding vanes which move in axial direction inside a sealed casing, said rotor is operatively connected to a power shaft, and said casing is connected to a low pressure gas intake, and to a high pressure gas discharge conduit;

a rotary sliding vane expansion mechanism characterized to have a rotor assembly with sliding vanes which move in axial direction inside a sealed casing, said rotor is operatively connected to a power shaft, and said casing is connected to a high pressure gas intake, and to a low pressure gas discharge conduit;

a liquid positive displacement helical gear pump assembly directly mounted on said power shaft, and is characterized to have two intermeshing male, and female gears enclosed in a sealed enclosure, and have a low pressure suction, and a high pressure discharge connections;

a liquid power fluid filter receiver connected to the intake of said liquid pump;

a permanent magnet brushless, variable speed A.C. or D.C. electric power motor having a rotor fitted on said power shaft, and is commutated by electronic switching means that switches the voltage supplied into the stator coil winding leads in response to the rotor's positions;

a hermetically sealed enclosure adapted to house the assembly of said electric motor sliding vane gas compressor, sliding vane gas expander, and rotary gear liquid pump, said enclosure is characterized to be assembled of two or more welded metal parts with sealed pipe and wire connections, and vibration isolation mounting support means.

6. An apparatus to be employed in the combination of claim 3 for a hermetically sealed electrically driven reciprocating piston gas compressor-expander, and liquid pump unit comprising:

a reciprocating piston gas compression mechanism having one or more pistons, each piston is enclosed in a sealed cylinder, and is operatively connected to a power shaft through a connecting rod, and eccentric or crank arm;

a reciprocating piston gas expansion mechanism having one or more pistons, each piston is enclosed in a sealed cylinder, and is operatively connected to said power shaft through a connecting rod, and an eccentric or crank arm;

a liquid positive displacement helical gear pump assembly directly mounted on said power shaft and is characterized to have two intermeshing male and female gears enclosed in a sealed enclosure, and have a low pressure suction, and a high pressure discharge connections;

a permanent magnet brushless variable speed A.C. or D.C. electric power motor having a rotor fitted on said power shaft, and is commutated by electronic switching means that switches the voltage supplied into the stator coil winding leads in response to the rotor's position;

distribution valve to alternate release of high pressure gas intake, and low pressure gas exhaust in cooperation with the position of the drive shaft to affect synchronous actuation of the expander pistons to continuously drive the power shaft;

a hermetically sealed enclosure consisting of welded shell to house said electric motor, reciprocating gas compressor, reciprocating gas expander, and rotary gear liquid pump, said disclosure has resilient support means, sealed gas and liquid pipes, and electric power wiring terminal connections.

* * * * *